(12) United States Patent
Urbonas et al.

(10) Patent No.: US 12,487,502 B2
(45) Date of Patent: Dec. 2, 2025

(54) OPTICAL LOGIC USING SEEDED EXCITON-POLARITON CONDENSATES

(71) Applicant: International Business Machines Corporation, Armonk, NY (US)

(72) Inventors: Darius Urbonas, Adliswil (CH); Thilo Hermann Curt Stoeferle, Rueschlikon (CH); Rainer F. Mahrt, Maennedorf (CH)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 18/052,219

(22) Filed: Nov. 3, 2022

(65) Prior Publication Data

US 2024/0152027 A1    May 9, 2024

(51) Int. Cl.
*G02F 3/00*    (2006.01)
(52) U.S. Cl.
CPC ............ *G02F 3/00* (2013.01); *G02F 2201/06* (2013.01); *G02F 2203/15* (2013.01)
(58) Field of Classification Search
CPC ... G02F 3/00; G02F 3/02; G02F 3/028; G02F 2201/06; G02F 2203/15
See application file for complete search history.

(56) References Cited

U.S. PATENT DOCUMENTS

| | | |
|---|---|---|
| 7,486,849 B2 | 2/2009 | Mahrt |
| 2004/0027645 A1 | 2/2004 | Ishihara |
| 2009/0136189 A1 | 5/2009 | Handelman |
| 2010/0328744 A1 | 12/2010 | Xu |
| 2021/0405398 A1* | 12/2021 | Kolmakov .............. G02F 1/025 |

OTHER PUBLICATIONS

"Hybrid-Exciton Polariton optical switch", An IP.com Prior Art Database Technical Disclosure, Original Publication Date: Nov. 14, 2008, IP.com No. IPCOM000176534D, IP.com Electronic Publication date: Nov. 14, 2008, 6 pages.
Ballarini et al., "All optical polariton transistor", Nature Communications, 4, 1778, Published Apr. 30, 2013, 8 pages, https://doi.org/10.1038/ncomms2734.

(Continued)

*Primary Examiner* — Angela M. Medich
(74) *Attorney, Agent, or Firm* — Kelsey M. Skodje; Otterstedt & Kammer PLLC

(57) ABSTRACT

An optical gate device may have one or more optical cavities. The optical cavity may have an embedded optically-active material providing strong light-matter coupling. A pump input allows application to of a pulsed optical pump beam the optically-active material. The pump beam is absorbed by the optically active material to form an exciton-polariton condensate which emits light. The optical gate device may have an input waveguide to input a seed signal to the optical cavity. The optical gate device may include an output waveguide to output of an optical signal at a wavelength corresponding to a resonant mode of a the cavity. The device may operate in a manner such that, when the pump beam is applied to the pump input, an optical output signal is selectively provided in the output waveguide, via the input of the a seed signal and light emitted by the exciton-polariton condensate.

25 Claims, 11 Drawing Sheets

(56) References Cited

OTHER PUBLICATIONS

Baranikov et al., "All-optical cascadable universal logic gate with sub-picosecond operation", arXiv:2005.04802v1 [physics.optics] May 10, 2020, 28 pages.

Liew et al., "Exciton-polariton integrated circuits", Physical Review B., 82, (3), 033302, (2010), DOI: 10.1103/PhysRevB.82.033302, The American Physical Society, 6 pages.

Minzioni et al., "Roadmap on all-optical processing", Open Access, IOP Publishing, Journal of Optics, J. Opt. 21 (2019) 063001 (55pp), https://doi.org/10.1088/2040-8986/ab0e66.

Singh et al., "All-Optical Logic Gates: Designs, Classification, and Comparison", Advances in Optical Technologies, vol. 2014, Article ID 275083, 26 pages, 2014. https://doi.org/10.1155/2014/275083.

Zasedatelev et al., "A room-temperature organic polariton transistor", Nature Photonics 13, 378-383 (2019), Published Mar. 25, 2019, Abstract Only 10 pages, <https://doi.org/10.1038/s41566-019-0392-8>.

Zasedatelev et al., "Single-photon nonlinearity at room temperature", Nature 597, 493-497 (2021), <https://doi.org/10.1038/s41586-021-03866-9>, Abstract Only, 11 pages.

Miller et al. "Are optical transistors the logical next step?", Nature Photonics, Jan. 2010, 3 pages, vol. 4.

Stöferle et al. "Ultracompact silicon/polymer laser with an absorption-insensitive nanophotonic resonator", Nano Letters, Sep. 8, 2010, pp. 3675-3678, vol. 10, No. 9.

* cited by examiner

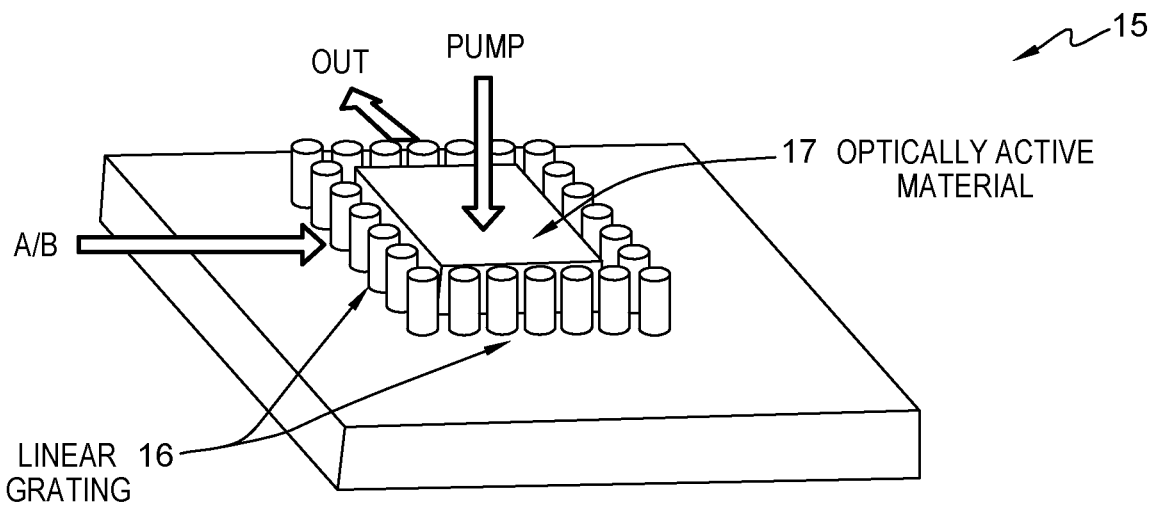
FIG. 5a
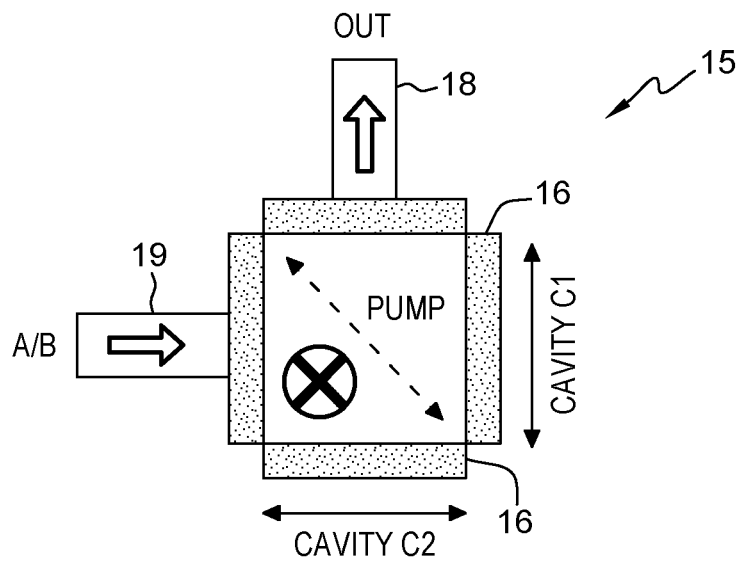
FIG. 5b
| NOR | | |
|---|---|---|
| A | B | OUT |
| 0 | 0 | 1 |
| 0 | 1 | 0 |
| 1 | 0 | 0 |
| 1 | 1 | 0 |
FIG. 6a
| NAND | | |
|---|---|---|
| A | B | OUT |
| 0 | 0 | 1 |
| 0 | 1 | 1 |
| 1 | 0 | 1 |
| 1 | 1 | 0 |
FIG. 6b IF R11 < R12 → OUT11
IF R12 < R11 → OUT12
IF R21 < R22 → OUT21
IF R22 < R21 → OUT22

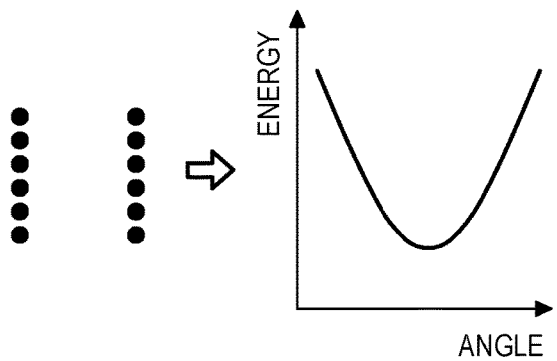
FIG. 12a
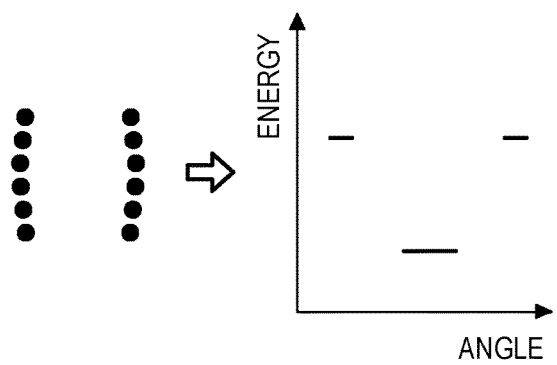
FIG. 12b
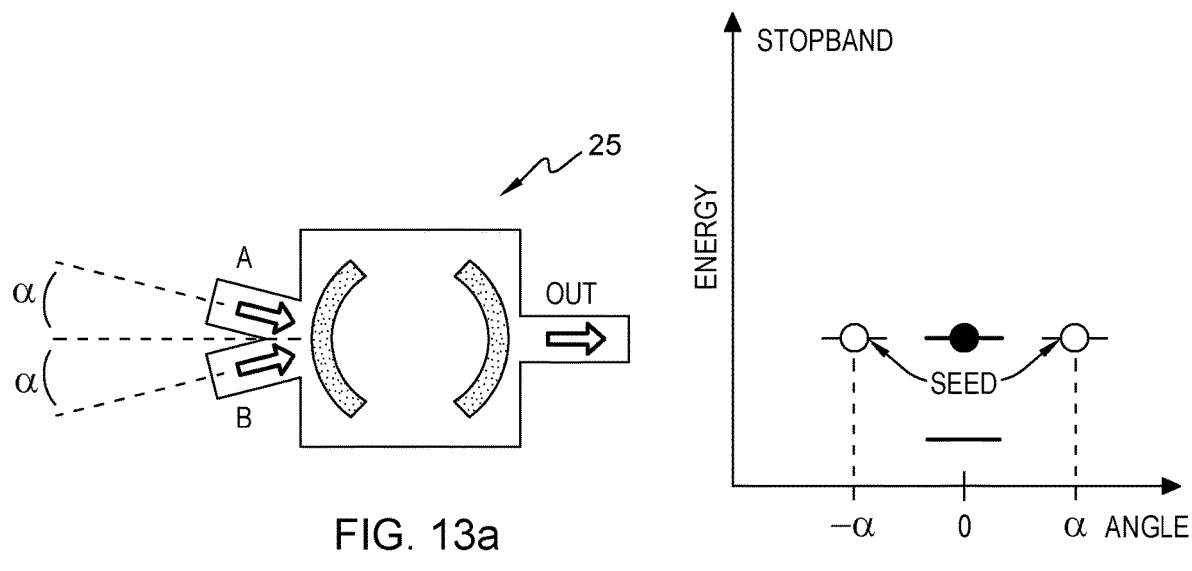
FIG. 13a
FIG. 13b

OPTICAL LOGIC USING SEEDED EXCITON-POLARITON CONDENSATES

STATEMENT REGARDING FEDERALLY SPONSORED RESEARCH OR DEVELOPMENT

The project leading to this application has received funding from the European Union's Horizon 2020 research and innovation program under FETOPEN project POLLOC, grant number 899141.

BACKGROUND

The present invention relates generally to optical logic using seeded exciton-polariton condensates. Optical gate devices exploiting such condensates are provided, together with corresponding methods and logic circuits based on these devices.

Data rates are continually increasing in all fields of information technology. Data rates achievable with electronic transistors have reached physical limits and there has been a move towards development of devices which use optics to encode data, rather than electrical signals. Optical transistors and other optical logic devices offer higher switching speeds and potentially lower power consumption than today's electronic devices. This has generated a push to develop improved optical devices, with faster switching and greater efficiency to accommodate the ever-increasing demand for higher data rates.

All-optical logic gates based on optically non-linear materials or semiconductor optical amplifiers have been proposed. However, such devices do not offer fast enough switching or sufficient energy efficiency for many applications.

SUMMARY

A first aspect of the present invention provides an optical gate device comprising at least one optical cavity, formed on a substrate, for confining light in a direction parallel to the substrate and including an optically-active material providing strong light-matter coupling with the cavity. The device has a pump input for application to the optically-active material of a pulsed optical pump beam, at a wavelength which is absorbed by the material to enable formation of an exciton-polariton condensate emitting light, and at least one input waveguide adapted for input to a the cavity of at least one optical seed signal at a wavelength corresponding to a resonant mode of the cavity and in a direction parallel to the substrate. The device further comprises an output waveguide adapted for output of an optical output signal at a wavelength corresponding to a resonant mode of a the cavity and in a direction parallel to the substrate. The device is adapted such that, when the pump beam is applied via the pump input, the optical output signal is selectively provided in the output waveguide, in dependence on input of the at least one seed signal, by light emitted from the exciton-polariton condensate.

Devices embodying this invention offer fully-optical implementation of logic gate functionality based on seeded exciton-polariton condensates. The logical output state is defined by the optical output signal of the gate device, and one or more logical input states of the device are defined by the seed signal(s). Embodiments can be configured to implement various types of logic gate, including universal logic gates. Moreover, individual devices can be readily cascaded to implement combinational logic circuits with any desired logic functionality. The cavity configuration in conjunction with input and output waveguides arranged parallel to the substrate provides a highly scalable architecture for integrated, all-optical logic circuits with ultrafast switching and exceptional energy efficiency.

In some embodiments, the device may have a single optical cavity and a single input waveguide for input of a plurality of seed signals, at a wavelength corresponding to a resonant mode of the cavity, in a direction aligned with the output waveguide. With this configuration, the device is adapted such that, when the pump beam is applied at a certain, first excitation fluence below a threshold for formation of an exciton-polariton condensate by the pump beam, formation of the condensate and emission of light providing the output signal occurs in response to input of a single seed signal. Also, when the pump beam is applied at a second, lower excitation fluence, formation of the condensate and emission of light providing the output signal occurs in response to input of all seed signals. These embodiments (which exploit threshold-switching in seeded exciton-polariton condensates as explained below) provide simple, single-cavity device structures offering both OR- and AND-gate functionality depending on selection of the pump excitation fluence.

In preferred embodiments, at least one cavity of the device supports at least two spatially-overlapping resonant modes. In these embodiments, the device is adapted such that application of the pump beam via the pump input without input of any seed signal produces an exciton-polariton condensate, associated with one of the resonant modes, from which emission of light provides the device output signal. However, input of a predetermined number of seed signals during application of the pump beam produces an exciton-polariton condensate, associated with one or more other resonant modes, inhibiting the emission of light providing the output signal. In these embodiments, a condensate is produced by the pump beam alone, absent any seed signals. However, input of the required number of seed signals (depending on required gate functionality) produces a condensate associate with the other resonant mode(s). This condensate competes for excitations in the system, and this "mode competition" results in inhibition of the output signal. These embodiments offer NOT, NOR or NAND gate functionality depending on the number of seed signals and device characteristics as explained below. It will be appreciated that NAND and NOR gates are particularly advantageous because these are universal logic gates, i.e. combinations of either of these gates can be used to construct any other Boolean logic function. Moreover, presence of a condensate in the "pump-only" mode of these embodiments is advantageous because it helps to control the dynamics of the exciton reservoir, permitting realization of faster gates.

In some embodiments, the pump input may be arranged for application of the pump beam at a non-zero angle to the substrate. Advantageously, however, in embodiments where the cavity (or cavities) support more than one spatially overlapping resonant mode, the pump input can comprise a waveguide for input of the pump beam in a direction parallel to the substrate. This provides a fully "in-plane" architecture for enhanced integration, and also offers the possibility of stacking overlaid logic in multilayer circuit structures.

In particularly advantageous embodiments, the spatially-overlapping resonant modes are provided by at least two spatially-overlapping cavities. In these embodiments, the device is adapted such that application of the pump beam without input of any seed signal produces an exciton-polariton condensate, associated with a mode of a first cavity, from which emission of light provides the device output signal. However, input of the predetermined number of seed signals to at least one other cavity during application of the pump beam produces an exciton-polariton condensate, associated with a mode of the or each other cavity, inhibiting emission providing the output signal. These "crossed-cavity" embodiments can employ various advantageous device configurations described further below. Other embodiments, presented below, can provide NOR/NAND operation in devices with only a single cavity.

Embodiments may employ at least one linear cavity (i.e., a cavity having opposed mirrors at respective ends of the cavity), and the mirrors of one or more such cavities may be curved to provide localized states, in dispersion relations associated with the resonant modes, for the exciton-polariton condensate produced by the seed signal(s) and/or the exciton-polariton condensate emitting light providing the output signal. Use of localized states offers well-defined device operation, enabling precise matching to waveguide characteristics for highly-efficient operation.

Further aspects of the invention provide optical logic circuits comprising a plurality of optical gate devices as described above, wherein the output waveguide of at least one of the devices is coupled to an input waveguide of another of the devices. Advantageously, in logic circuits which employing crossed-cavity gate devices, the cavity lengths can be tuned to exploit wavelength blueshifts resulting from condensation, facilitating cascading of devices and inhibiting back-coupling between cascaded devices.

A still further aspect of the invention provides a method for implementing an optical logic gate. The method comprises providing an optical gate device as described above, applying the pump beam to the optically-active material of the device, and selectively inputting at least one optical seed signal to the device whereby the optical output signal is selectively provided in the output waveguide of the device.

Embodiments of the invention will be described in more detail below, by way of illustrative and non-limiting example, with reference to the accompanying drawings.

BRIEF DESCRIPTION OF THE SEVERAL VIEWS OF THE DRAWINGS

FIGS. 5a and 5b are schematic illustrations of a second type of gate device embodying the invention.

FIGS. 6a and 6b show truth tables for logic functionality in respective embodiments of the second type of gate device.

FIGS. 12a and 12b illustrate dispersion characteristics for cavities with plane and curved mirrors.

FIGS. 13a and 13b illustrate structure and operation of a single-cavity gate device exploiting dispersion characteristics with localized states.

DETAILED DESCRIPTION

Figure 1:
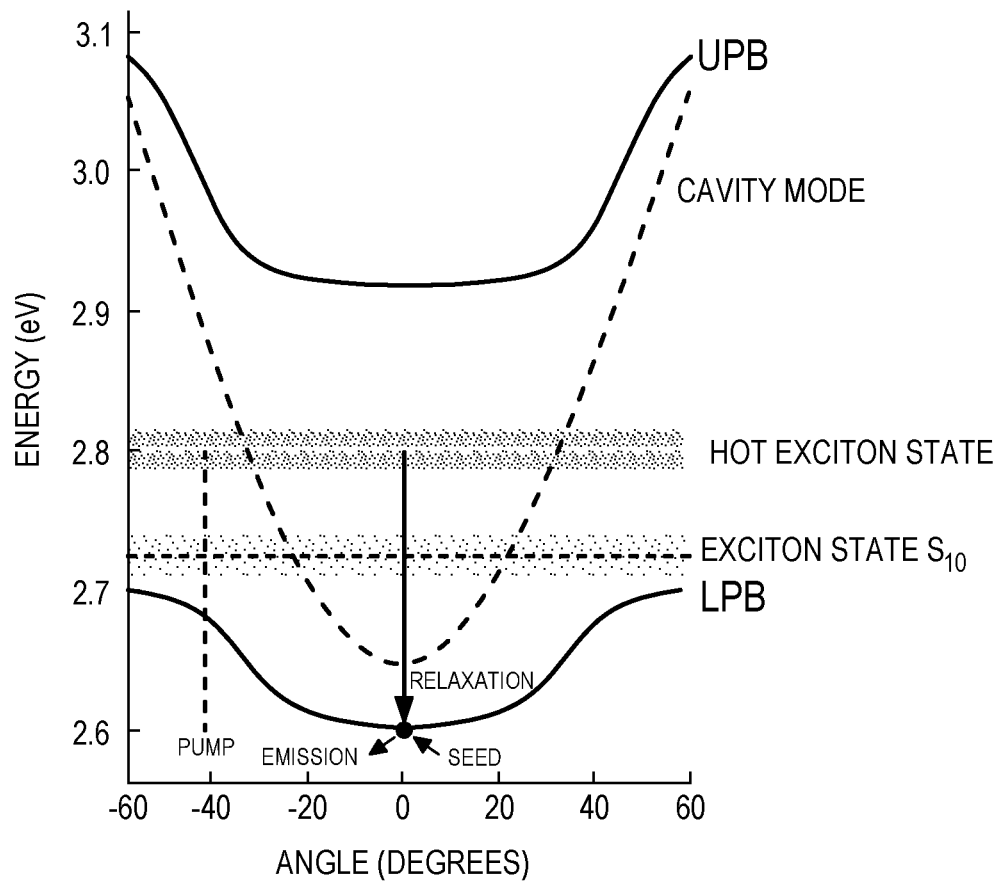
FIG. 1 is a schematic energy diagram illustrating dispersion relations for an optical cavity in the strong-light matter coupling regime.

The demand for speed and efficiency has led to the development of optical devices that harness light-matter coupling to create quasi-particles, known as exciton-polaritons, which combine the properties of optical fields with electronic excitations in an optically active material. For example, an all-optical transistor in which an optical microcavity containing an optically-active material operates in a strong light-matter coupling regime (i.e., where the strength of the light-matter coupling exceeds losses) creating exciton-polariton condensates with quantum fluid properties. A pulsed optical pump beam excites the optically-active material above a threshold excitation fluence for formation of an exciton-polariton condensate resulting in an emission of light. An additional optical control signal ("seed signal") is used for triggering bosonic stimulation, concentrating the emission on the seeded polariton states and significantly amplifying emissions from the condensate due to exciton-to-polariton relaxation. This use of seeded exciton-polariton condensates offers an all-optical switch with ultrafast (sub-picosecond) switching and exceptional energy efficiency, capable of operating down to the single photon. However, this switch architecture is not readily scalable. Another drawback of this approach is it does not lend itself to high-density integration in efficient, integrated logic circuits using all-optical gate devices. Scalable Devices for implementing all-optical logic and efficient high-density integration would be highly desirable.

The gate devices to be described exploit seeded exciton-polariton condensation in optical cavities. Exciton-polariton condensates (EPCs) can be formed via optical excitation of an optically-active material providing strong light-matter coupling with an optical cavity. In an optically-active material with optical absorption/emission near a resonance wavelength of the cavity, strong light-matter coupling between a resonant mode of the cavity and an excited ("exciton") state of the material results in formation of new, hybrid photon-exciton (or "polariton") resonant modes. This is depicted in the energy diagram of FIG. 1 which shows dispersion relations for resonant modes of a cavity in the strong light-matter coupling regime. In this diagram, energy is plotted against angle of light with respect to normal incidence on a cavity. The dashed curve indicates dispersion for the cavity (optical) mode. The curves labelled UPB and LPB indicate dispersion for two polariton branches associated with the cavity mode. These comprise an upper polariton branch (UPB) and a lower polariton branch (LPB) corresponding to polariton eigenmodes resulting from strong light-matter coupling between the cavity mode and an exciton state, here the first excited singlet state $S_{10}$ of MeLPPP (the optically-active material in this example) at 2.72 eV. As indicated by the dashed arrow in the figure, the active material can be excited by applying a pulsed optical pump beam at a wavelength which is absorbed by the material, creating a reservoir of pump-injected "hot" excitons, typically at one vibron (a quantum of vibrational energy specific to the active material) above the lowest-energy polariton state, here at 2.8 eV. This provides a vibron-mediated relaxation channel (bold arrow in the figure) for energy relaxation from the hot excitons to polariton states of the lower polariton branch, resulting in emission of light from the polaritons. Light emission increases generally linearly with increasing excitation fluence of the pump beam up to a certain threshold level. This threshold marks formation of an EPC, and emission then increases non-linearly with pump excitation fluence above threshold, giving amplified emission.

If an additional seed signal is applied at a wavelength corresponding to a resonant mode of the cavity (e.g., at a wavelength resonant with the LPB), bosonic stimulation results in stimulated scattering from the exciton reservoir which concentrates the initial exciton population in a particular polariton state. This "seeding" of a polariton state (the ground polariton state in the FIG. 1 example) reduces the threshold for polariton condensation (i.e., formation of the EPC) and significantly enhances the exciton-to-polariton relaxation rate, resulting in amplified emission concentrated on the seeded polariton state.

Figure 2A:
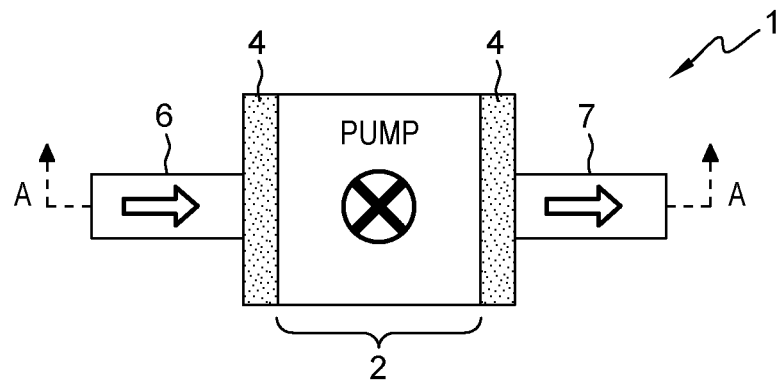
FIGS. 2a and 2b are schematic plan and cross-sectional views illustrating basic features of a gate device embodying the invention.
Figure 2B:
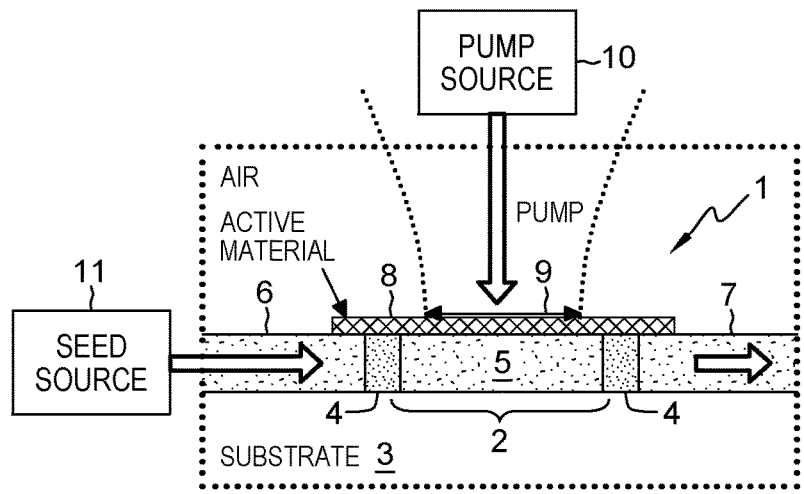

Basic features of gate devices embodying the invention will be described in relation to an embodiment illustrated in FIGS. 2a and 2b. FIG. 2a shows a schematic plan view of a simple optical gate device, and FIG. 2b shows a schematic cross-section on line A-A of FIG. 2a. Optical gate device 1 comprises optical cavity 2 which is formed on substrate 3. Cavity 2 is a linear cavity comprising two, laterally-opposed cavity mirrors 4 embedded in transparent layer 5 which forms the transparent medium in the cavity and input waveguide 6 and an output waveguide 7. Cavity 2 includes optically-active material layer 8. Optically-active material layer 8 may provide strong light-matter coupling with the cavity. The resulting cavity thus operates in the strong light-matter interaction regime where the incoherent loss-rate of the material and optical cavity is lower than the light-matter coupling rate. In an embodiment, cavity 2 may be arranged for confining light in a direction parallel to the substrate. For example, laterally in a plane substantially parallel to the plane of substrate 3. Vertical confinement in optical cavity 2 is achieved by total internal reflection at boundaries with materials above and below the optical cavity 2. In this example, substrate 3 comprises a transparent material having a refractive index lower than that of transparent layer 5 in optical cavity 2. Similarly, the material (e.g., air) above the optical cavity 2 is also transparent and has a refractive index lower than that of optically-active material layer 8.

Optical gate device 1 has pump input 9, where pump input 9 is a region of optically-active material layer 8 exposed to air in the immediate example. The exposed region corresponding to pump input 9 allows for application of a pulsed optical pump beam generated by pump source 10 to optically-active material layer 8. Here, pump input 9 is arranged for application of the pump beam at a non-zero angle to plane of substrate 3. In an embodiment, the pump beam provided to pump input 9 is orthogonal to the plane of substrate 3 and to the surface of material layer 8. The pump beam may be a wavelength which is absorbed by material 8 to enabling formation of excitations (excitons) followed by the formation of an EPC emitting light. In some embodiments, an EPC is formed spontaneously in response to application of the pump beam alone, without requiring input of any additional signals. In some embodiments, the input of one or more additional signals may be required for condensation to occur. For example, input waveguide 6 may be adapted to input into cavity 2 one or more optical seed signals, provided by seed source 11, at a wavelength corresponding to a resonant mode of the cavity (e.g., at a wavelength resonant with the LPB) and in a direction parallel to substrate 3. Output waveguide 7 may be adapted for output of an optical output signal at a wavelength corresponding to a resonant mode of the cavity (e.g., at a wavelength resonant with the LPB) and in a direction parallel to substrate 3.

While FIG. 1 depicts optical gate device 1 with configuration of a single cavity (e.g., optical cavity 2), embodiments of the invention may comprise one or more optical cavities, and may have one or more input waveguides adapted for input of one or more seed signals into a cavity. Where the seed signal is a wavelength corresponding to a resonant mode of the respective cavity. Additional embodiments of such gate devices presented below. Gate devices embodying the invention may be adapted such that, when the pump beam is applied via the pump input, the optical output signal is selectively provided in output waveguide 7, in dependence on input (or not) of at least one seed signal, by light emitted from the exciton-polariton condensate. The logical output state of the device may be defined by the optical output signal, and one or more logical input states of the device may be defined by the seed signal(s). Presence of the optical output signal in output waveguide 7 may correspond to a logical output "1", while no output signal (or less than a threshold output signal level) may correspond to logical output "0". Similarly, input of a seed signal may correspond to a logical input "1" while absence of the seed signal (or less than a threshold seed signal level) may correspond to logical input "0".

Devices embodying the invention can be adapted to implement gate functionality by virtue of features such as the structure, arrangement, and properties of the cavity (or cavities) and the optically-active material, as well as waveguide characteristics, dispersion relations for resonant modes, and characteristics of the seed and pump beams. Embodiments can be adapted to implement various types of logic gate depending on features/parameters such as: device configuration (e.g., the type, number and arrangement of cavities, the type, number and arrangement of input and output waveguides and the number of seed signals required for a desired logic function), device characteristics (e.g., cavity size/length, material properties, and type/form/reflectivity of mirrors) type, form and properties of the optically-active material, the particular resonant (optical/polariton) modes supported by the cavity or cavities, and parameters (e.g., wavelength, intensity and input angle of seed signals, pump wavelength, pump polarization and angle of incidence, pump beam-shape, and pump power/intensity/excitation fluence). Particular parameters will be explained further in relation to embodiments depicted below, and appropriate parameters for operation of the various gates will be readily apparent to those skilled in the art from the principles and operation described.

An optical gate device embodying the invention may be fabricated as integrated structures using well-known material processing techniques. By way of example, optical gate device 1 of FIG. 2a may be realized using silicon-on-insulator technology, with cavity mirrors 4 implemented as high-contrast gratings. Gratings may be implemented by rows of periodic silicon structures (cuboids, cylinders, etc.), formed by lithographic processing of a silicon layer (e.g. about 200 to 300 nm-thick), on a silicon dioxide substrate a few microns (e.g., between 5 and 20) in thickness. The length of optical cavity 2 (i.e. distance between cavity mirrors 4) may be of the order of a few microns. Transparent layer 5 may be composed of SiN, $SiO_xN_y$, $SiO_2$, $Ta_2O_5$, $TiO_2$, TiON, HfO, NbO or similar materials and can be overlaid and structured to provide the medium of optical cavity 2 and input waveguide 6 and output waveguide 7. Optically-active material layer 8 may be provided by a layer of ladder-type conjugated polymer, (e.g. MeLPPP), which may be spin-coated on the resulting structure to an appropriate thickness (e.g., 150 to 300 nm). Further, optical cavity 2 and input waveguide 6 and output waveguide 7, may be configured as a fully-integrated in-plane structure.

In an embodiment, pump source 10 may be implemented in any appropriately known manner (e.g., an ultrafast laser with a microscope objective or may be applied as a patterned beam or without any focusing lens in to pump a larger area). Seed source 11 may be implemented by a pulsed light source with a desired wavelength, or a seed signal may be provided by the output signal of another gate device as discussed below.

Figure 3A:
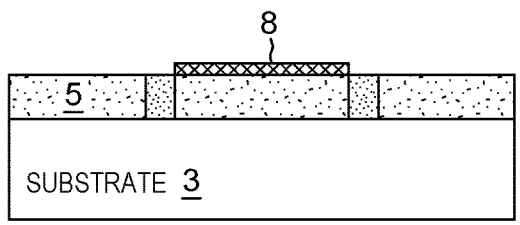
FIGS. 3a through 3f illustrate various cavity structures in gate devices embodying the invention.
Figure 3B:
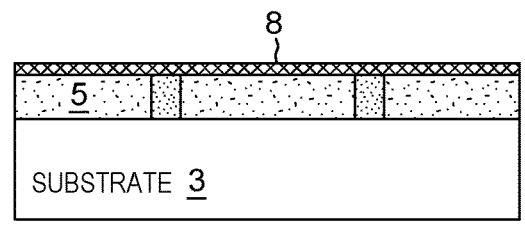
Figure 3C:
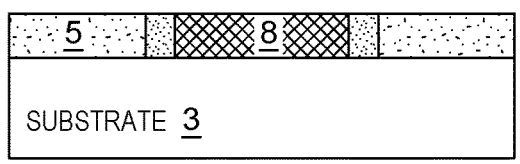
Figure 3D:
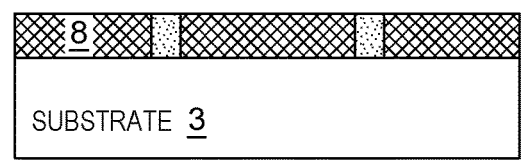
Figure 3E:
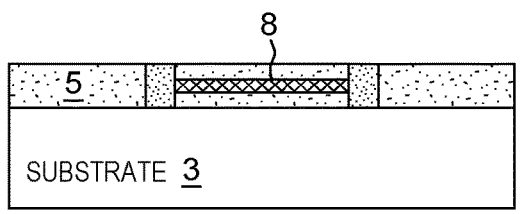
Figure 3F:
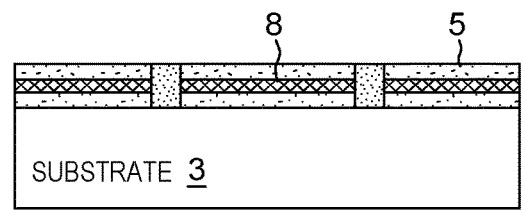

Various alternative arrangements can be envisaged to provide overlap between the active material and the electromagnetic field in optical cavity 2. Examples are illustrated in FIGS. 3a through 3f. Optically-active material layer 8 may be localized over the cavity medium (FIG. 3a) or overlay the entire structure (FIG. 3b). The optically-active material layer 8 may fill the entire cavity (FIG. 3c), and may entirely overlay a transparent (e.g., $SiO_xN_y$, SiN or similar material) substrate (FIG. 3d) in which the input waveguide 6 and output waveguide 7 are structured. FIGS. 3e and 3f show further variations where the Optically-active material layer 8 is embedded in the transparent layer 5 providing the waveguides. Input waveguide 6 and output waveguide 7 can be implemented in any convenient manner, and exploit various physical principles to guide the light, using techniques well-known in the art.

In general, cavity mirrors 4 may be implemented in any convenient manner, (e.g., high-contrast gratings, distributed Bragg reflectors, photonic crystals, or metal surfaces and the like). The active cavity material may be provided by a variety of conjugated organic materials, such as: π-conjugated polymers like ladder type poly-paraphenylenes (e.g., MeLPPP), poly-fluorenes (e.g., PF2/6), poly-para phenylenevinylenes (e.g., PPV), etc.; π-conjugated oligomers of the aforementioned polymers; and π-conjugated small molecules like anthracen, cyanine dyes, BODIPY, green fluorescent protein, etc. Alternatively, the optically-active material may comprise at least one semiconductor material forming one or more quantum dots, nanowires, quantum wells, or a bulk semiconductor layer. Semiconductor materials here may comprise, for example, lead halide perovskites and III-V or II-VI semiconductors. Additionally, in some embodiments various types of cavity may be utilized, such as ring/disc/racetrack resonators, as well as Fabry-Perot-style HCG (High-Contrast Grating) cavities.

Figure 4A:
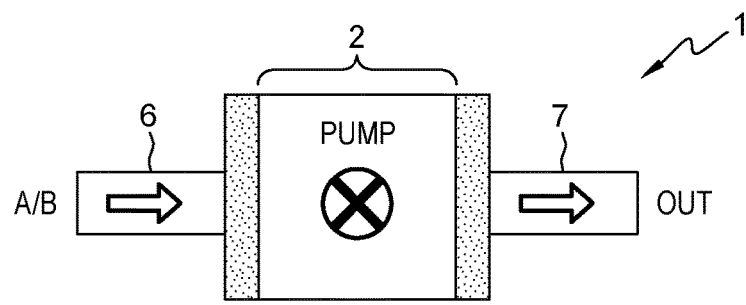
FIGS. 4a through 4c illustrate operation of a first type of gate device embodying the invention.
Figure 4B:
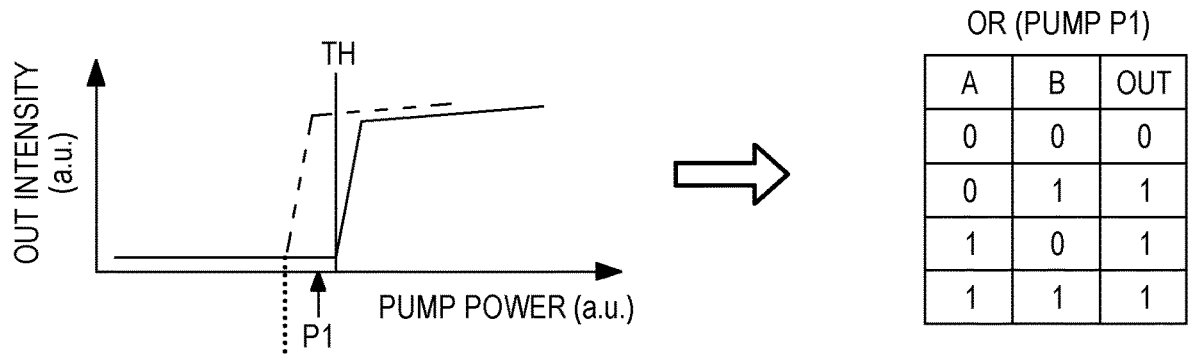
Figure 4C:
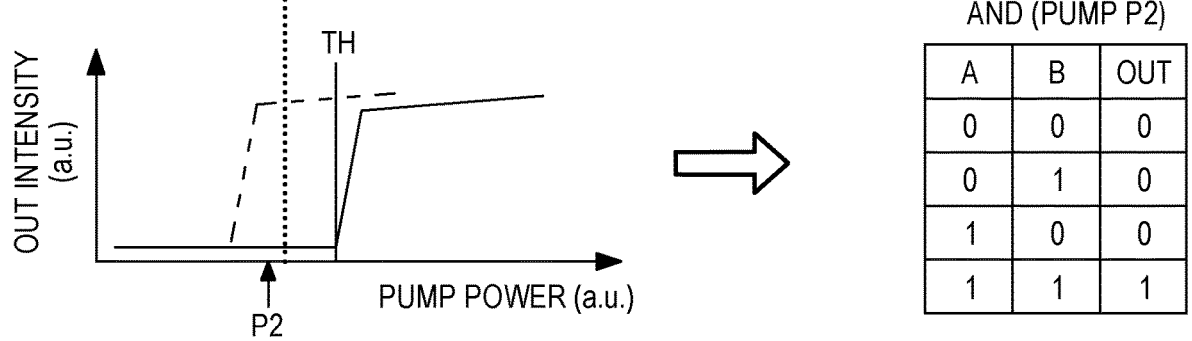

FIGS. 4a through 4c illustrate operation of a first type of gate device embodying the invention. As illustrated in FIG. 4a, this embodiment is based on the structure of optical gate device 1 of FIG. 2a, having a single optical cavity 2 and a single input waveguide 6 for input of a plurality of seed signals, here two signals denoted by A and B, in a direction aligned with the output waveguide 7. FIG. 4b shows the variation of output signal intensity with pump power (and hence excitation fluence), both in arbitrary units (a.u.), in the pump-only mode with no input seed signal (solid line), and when a single seed signal, A or B, is input (dashed line) during pump application. The threshold labeled TH marks the transition from the linear to the non-linear regime in the pump-only mode. Above this threshold, the pump power is sufficient for spontaneous formation of an EPC in optical cavity 2. OR-gate operation is achieved in this device using a first pump power, denoted by P1, which is less than the threshold TH. No EPC is therefore present in the pump-only mode. However, when one seed signal, A or B, is input to the device, the resulting seeding of polariton states causes the condensation threshold to be reduced as explained above, here to a level below P1. This causes formation of the condensate and emission of light providing an output signal in output waveguide 7. With the pump at P1, the device is thus adapted to implement OR gate functionality as shown in the truth table in FIG. 4b.

FIG. 4c illustrates device operation with a second, lower pump power P2. Here, input of one seed signal, A or B, is insufficient for condensation to occur. However, when both input seed signals are present, the condensation threshold is reduced below P2, resulting in formation of the EPC and emission of the output signal in output waveguide 7. This provides AND gate functionality according to the truth table in FIG. 4c.

By exploiting the threshold switching-effect described above, both OR and AND gate operation can be selectively provided in a simple, single-cavity structure. Only one resonant cavity mode is required for operation, and input and output signals use a single wavelength.

A second, and preferred, type of gate device embodying the invention has at least one cavity supporting at least two spatially-overlapping resonant modes. These devices are adapted such that application of the pump beam without input of any seed signal produces an EPC, associated with one of the resonant modes, from which emission of light provides the device output signal. However, input of a predetermined number of seed signals during application of the pump beam produces an EPC, associated with one or more other resonant modes, inhibiting the emission of light providing the output signal. In the pump-only mode of operation, an EPC is thus present in a polariton branch of the first resonant mode, but input of the required number of seed signals produces a condensate in a polariton branch of another resonant mode or modes. This condensate competes for the excitations in the system and, as a result of this mode competition, emission from the EPC associated with the first resonant mode is reduced and the output signal is inhibited.

The spatially-overlapping resonant modes may be provided by at least two spatially-overlapping cavities, whereby application of the pump without input of any seed signal produces an EPC associated with a mode of a first cavity, from which emission provides the device output signal. Then, input of the required number of seed signals to at least one other cavity produces an EPC, associated with a mode of the (or each) other cavity, which competes for excitations in the system and inhibits the output signal.

FIGS. 5a and 5b illustrate structure of one embodiment of this type of device. Optical gate device 15 has two orthogonal linear cavities, denoted by C1 and C2 in FIG. 5b. As shown in FIG. 5a, each cavity is formed by a pair of opposed linear gratings 16 within which optically-active material 17 is embedded. Output waveguide 18 (omitted in FIG. 5a) is parallel to (here aligned with) the optical axis of first cavity C1. This embodiment has a single input waveguide 19 (omitted in FIG. 5a) for input of a plurality of seed signals, here two signals A and B. Input waveguide 19 is aligned with the optical axis of second cavity C2 in this example. In general, however, the mode profile of a waveguide is chosen to match the particular cavity mode used in operation of the device.

In this embodiment, the pump beam (not shown) is applied orthogonally to optically-active material 17. The polarization of the pump beam (indicated schematically by the dashed arrow in FIG. 5b) is set such that pump excitation is "divided between" resonant modes of both cavities, the particular division of pump power being determined by the pump polarization direction relative to the optical axes of the two cavities. The pump polarization is set such that application of the pump, absent any input seed signal, produces an EPC oscillating in a resonant mode of cavity C1. Emission of light from this EPC provides the device output signal in output waveguide 18.

Optical gate device 15 can be adapted, based on cavity characteristics and appropriate setting of pump polarization angle, such that input of one seed signal, A or B, during application of the pump produces an EPC associated with a mode of cavity C2. This competes for excitations in the exciton reservoir, resulting in stimulated scattering which depletes the condensate in cavity C1, thereby inhibiting the output signal. With this implementation, optical gate device 15 operates as a NOR gate according to the truth table of FIG. 6a.

In another implementation, optical gate device 15 can be adapted such that input of all seed signals, here both A and B, is required to achieve condensation in cavity C2 and suppress condensation in cavity C1. The device then operates as a NAND gate according to the truth table of FIG. 6b.

By exploiting modes of spatially overlapping cavities, optical gate device 15 can thus provide either NOR or NAND functionality. Moreover, with appropriate device and pump characteristics, optical gate device 15 can be selectively operable either as a NOR gate or a NAND gate. This offers highly-efficient universal gate implementations. In addition, optical gate device 15 can be operable as a NOT gate if only one input seed signal is used with pump polarization set for the NOR operation described above. The presence of a condensate in the "pump-only" mode, irrespective of any applied input signals, in these embodiments allows increased switching speed and realization of even faster gates because the lifetime of excitations in the system with EPC is orders of magnitude shorter than without EPC due to the stimulated scattering process.

The configuration of optical gate device 15, with two, orthogonal crossed cavities, provides a particularly simple and efficient device structure. This also allows convenient cascading of devices, discussed further below, enabling multiple devices to be combined to produce optical combinational logic circuits in an area-efficient manner.

Figure 7A:
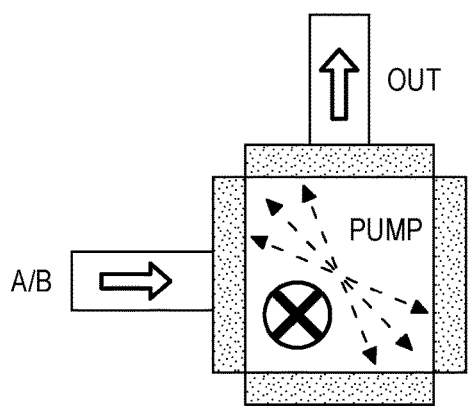
FIGS. 7a and 7b are schematic diagrams illustrating variation of parameters for controlling operation of gate devices embodying the invention.
Figure 7B:
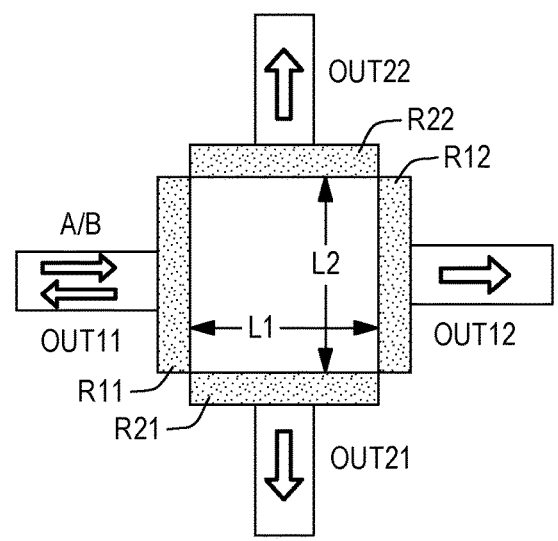

FIGS. 7a and 7b illustrate various ways in which device parameters can be adapted/tuned to control condensation in crossed-cavity embodiments. Adjustment of the pump intensity, and variation of pump polarization as shown in FIG. 7a to vary alignment with respect to the different cavities, can be used to control the proportion of pump power delivered to each cavity. In some embodiments, this may also be controlled by varying the pump beam shape. For example, a pump beam having an elliptical cross-section may be used, and the angle of the major axis of the ellipse can be varied relative to the optical axes of the cavities. As illustrated schematically in FIG. 7b, cavity Q-factors (quality factors) can be controlled by adjustment of cavity lengths (L1 and L2 in the figure) and reflectivity of mirrors. Mirror reflectivity (R11, R12, R21 and R22 in the figure) can be selected as indicated to accommodate different input/output directions for a desired arrangement of input/output waveguides.

Figure 8A:
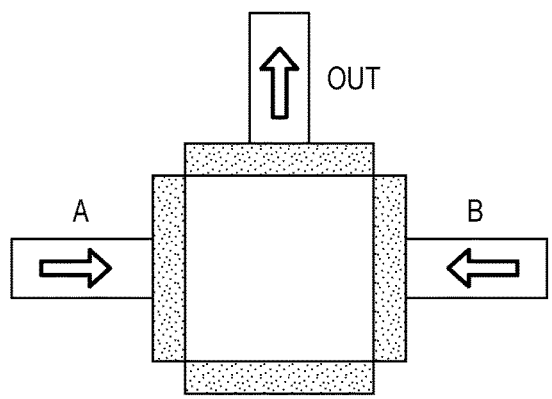
FIGS. 8a through 8c illustrate additional embodiments of the second type of gate device.
Figure 8B:
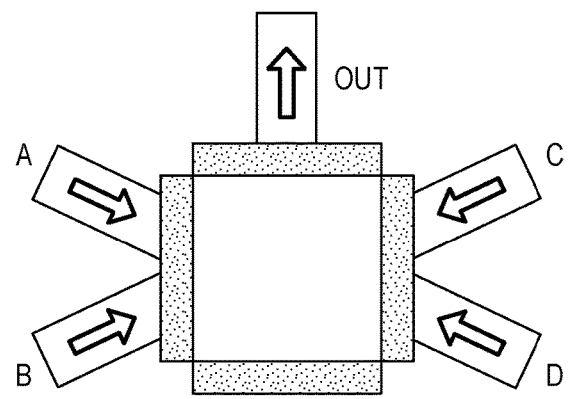
Figure 8C:
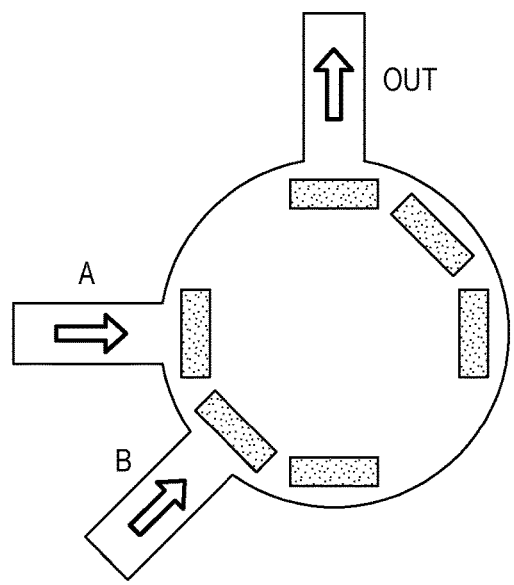

Crossed-cavity embodiments using a plurality of seed signals may have a plurality of input waveguides for input of respective seed signals to the second cavity. Examples of various other crossed-cavity embodiments are illustrated schematically in FIGS. 8a, 8b and 8c. FIG. 8a shows an embodiment with two input waveguides for input of respective seed signals A and B. This device configuration can also be used for selective input of both signals A and B via either input waveguide. FIG. 8b shows an example of a configuration using multiple (here 4) input seed signals. Crossed-cavity embodiments may also use three or more cavities. FIG. 8c shows one such arrangement using two cavities (in addition to the first cavity which emits the output signal) with corresponding input waveguides for input of respective seed signals to these cavities. Other crossed-cavity devices can of course be envisaged. These devices offer flexibility of implementation and operation with various cavity configurations.

Figure 9A:
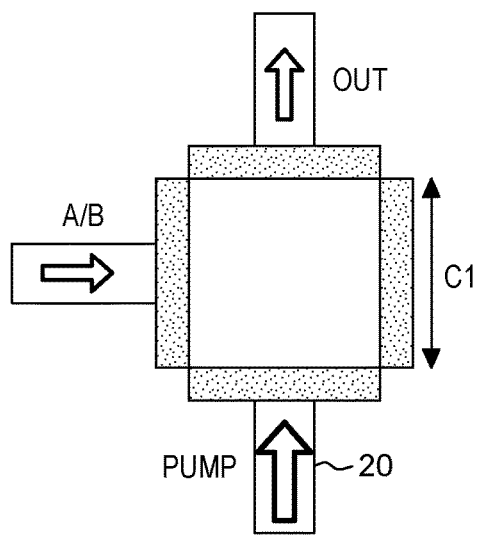
FIGS. 9a and 9b show exemplary gate devices using in-plane pump beams.
Figure 9B:
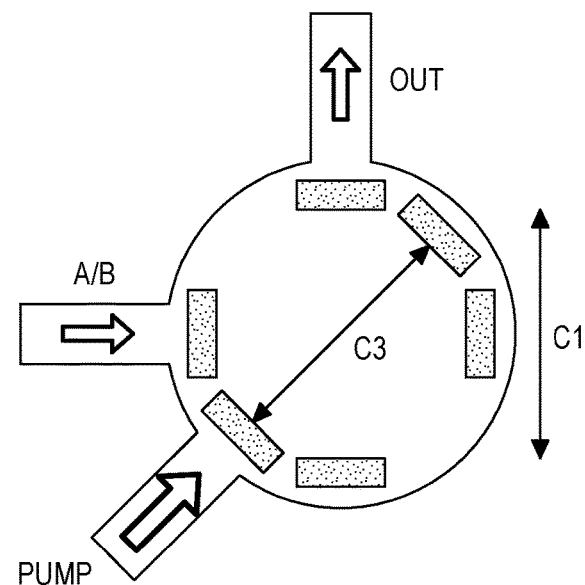

While the above embodiments use a pump beam applied orthogonally to the plane of the substrate, the pump may be applied at other non-zero angles to the substrate. In particularly preferred embodiments, however, the pump input comprises a waveguide for input of the pump beam in a direction parallel to the substrate. Exemplary configurations are shown in FIGS. 9a and 9b. FIG. 9a shows an orthogonal linear cavity embodiment. Here, the pump is input via a waveguide 20 at a wavelength resonant with a mode of the first cavity C1. FIG. 9b shows an alternative arrangement where the pump is input to a cavity C3 which is orientated at an angle to the first cavity C1 which emits the device output signal. This and other similar arrangements may also be modified by omitting the mirrors for cavity C3, effectively eliminating the need for an additional cavity for the pump input. Numerous other cavity configurations can be envisaged including a waveguide providing a pump input parallel to the substrate. These embodiments offer fully in-plane operation for enhanced device integration. Moreover, the pump wavelength does not then need to obey any constraints to match the polariton branches but just needs to be within the active material absorption spectral region.

Figure 10:
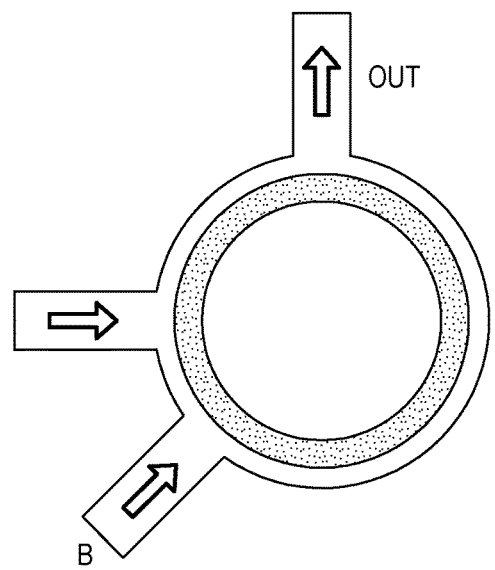
FIG. 10 shows a gate device of the second type using a single cavity.

Additional embodiments can exploit a single cavity which provides two or more spatially-overlapping resonant modes. FIG. 10 is a schematic illustration of one such embodiment having a single elliptical (here circular) cavity. Oval cavities may also be used if desired for tuning device characteristics.

Figure 11A:
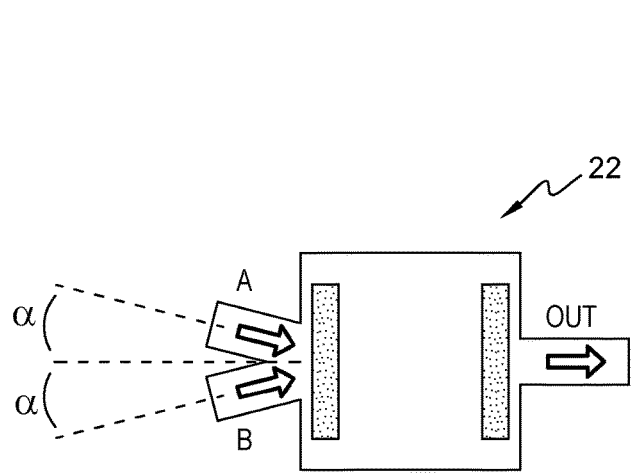
FIGS. 11a and 11b illustrate structure and operation of another single-cavity gate device.
Figure 11B:
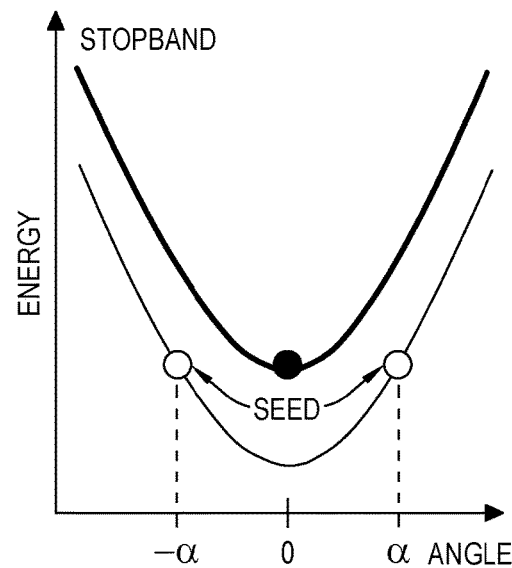

FIGS. 11a and 11b illustrate structure and operation of another single-cavity embodiment. As shown in FIG. 11a, Optical gate device 22 has a single linear cavity and two input waveguides for input of respective seed signals A and B to the cavity. The output waveguide is aligned with the optical axis at one end of the cavity, and the input waveguides are orientated at equal angles $\alpha$ to the optical axis at the opposite end of the cavity. FIG. 11b shows dispersion relations for resonant modes of the cavity. If no seed signal A or B is present, condensation takes place in the lowest-energy mode (i.e., angle=0) of the upper dispersion curve and provides the output signal in the output waveguide. If one seed (i.e., for NOR, or NOT, operation) or both seeds (i.e., for NAND operation) are present, condensation takes place at a higher in-plane quasi-momentum (angle=$\alpha$) of the lower dispersion curve, thus suppressing the output signal as described above. Seed and output signals are at the same wavelength here, providing single-wavelength (e.g., NAND/NOR) operation in a simple, single cavity device.

The schematics of FIGS. 12a and 12b show dispersion characteristics for linear cavities with plane and curved mirrors. As illustrated, plane mirrors give a continuous dispersion, whereas curved mirrors give dispersion relations with localized states. Such localized states can be exploited by embodiments of the invention to provide gate devices with improved operating characteristics. Structure and operation of one such example is illustrated in FIGS. 13a and 13b. Single-cavity optical gate device 25 is generally similar to optical gate device 22 of FIG. 11a but has curved mirrors. FIG. 13b illustrates operation with the resulting dispersion characteristics. If no seed is present, condensation occurs in the localized, lowest-energy state (i.e., angle=0) associated with one resonant mode, emitting the device output signal. If one (i.e., for NOR, or NOT, operation) or both (i.e., for NAND operation) seeds are present, condensation takes place in localized, higher-energy states associated with another mode and the output signal is suppressed. These and other embodiments exploiting localized states allow characteristics to be precisely tuned for well-defined device operation. This enables precise matching to waveguide characteristics and facilitates cascading of devices.

Figure 14A:
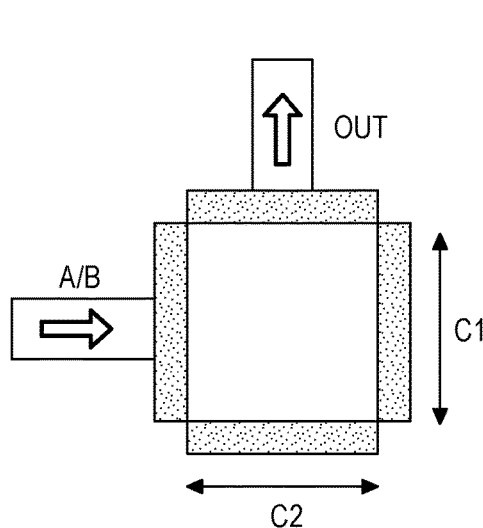
FIGS. 14a and 14b illustrate a wavelength blueshift effect due to condensation in an embodiment of the gate device.
Figure 14B:
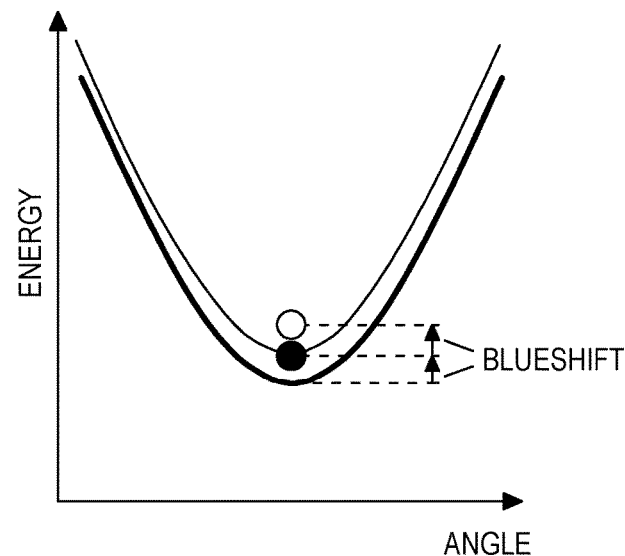

FIGS. 14a and 14b illustrates a wavelength blueshift effect occurring due to condensation in gate devices embodying the invention. FIG. 14a shows an orthogonal-cavity embodiment, here with cavity C1 having a length greater than cavity C2. FIG. 14b shows dispersion curves for modes of the cavities C1 and C2. The parabolas here define the dispersion characteristics with zero excitation energy (no pump). When the pump is applied, however, there is a pronounced blueshift in the dispersion relations whereby the parabolas effectively shift upwardly. The condensation producing the output signal, and condensation due to the input seed signal(s), thus occur at higher, blue-shifted energy states as indicated. This blueshift effect can be used to advantage as explained in the following.

Figure 15A:
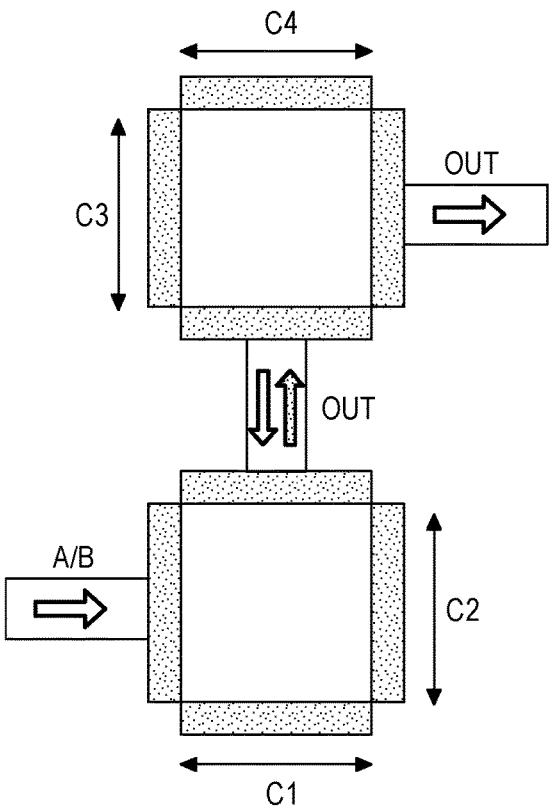
FIGS. 15a and 15b illustrate tuning of crossed-cavity lengths to exploit wavelength blueshift in cascaded gate devices embodying the invention.
Figure 15B:
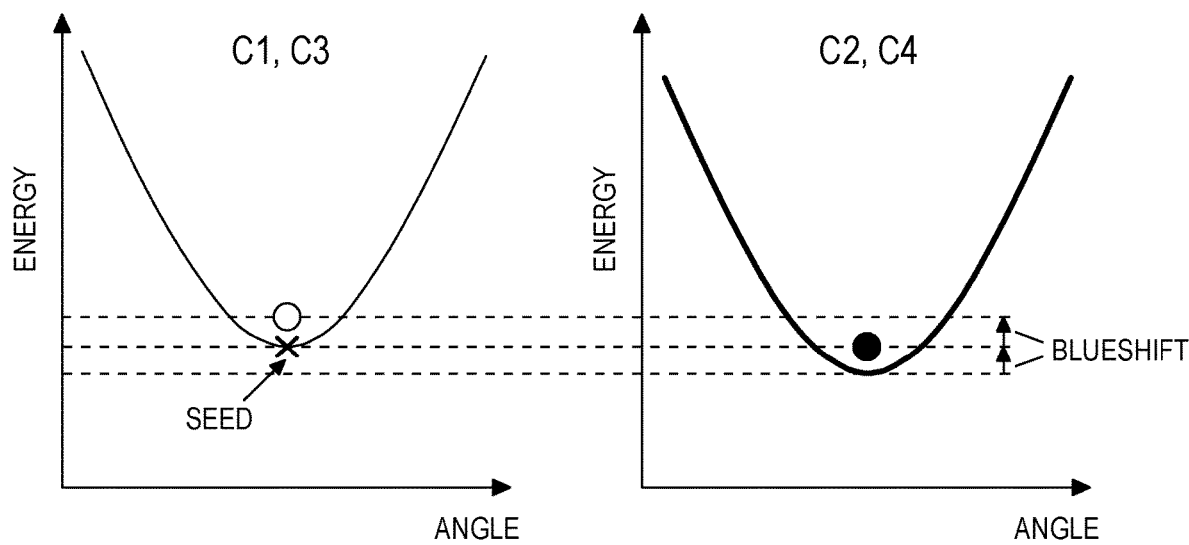

FIG. 15a shows two orthogonal-cavity devices which are connected in cascade such that the output waveguide of one device is coupled to the input waveguide of the other. The lengths of cavities labelled C1 and C3 are equal, as are the lengths of cavities C2 and C4. These cavity lengths are tuned to exploit the blueshift effect as illustrated in the energy diagrams of FIG. 15b. When C1 and C2 are pumped and there are no seeds A/B present (for NOR gate operation), condensation occurs at the blue-shifted energy shown in the right-hand energy diagram. The resulting output signal is at the correct wavelength to provide the seed signal to cavity C3, resulting in formation of a condensate which emits at the blue-shifted wavelength indicated in the left-hand energy diagram. Any resulting back-coupling from EPC in C3 to C2, indicated by the grey arrow in FIG. 15a, is thus at the wrong wavelength for resonance with cavity C2. Hence, by appropriate tuning of cavity-lengths to account for blueshift, back-coupling between cascaded devices can be inhibited.

Figure 16:
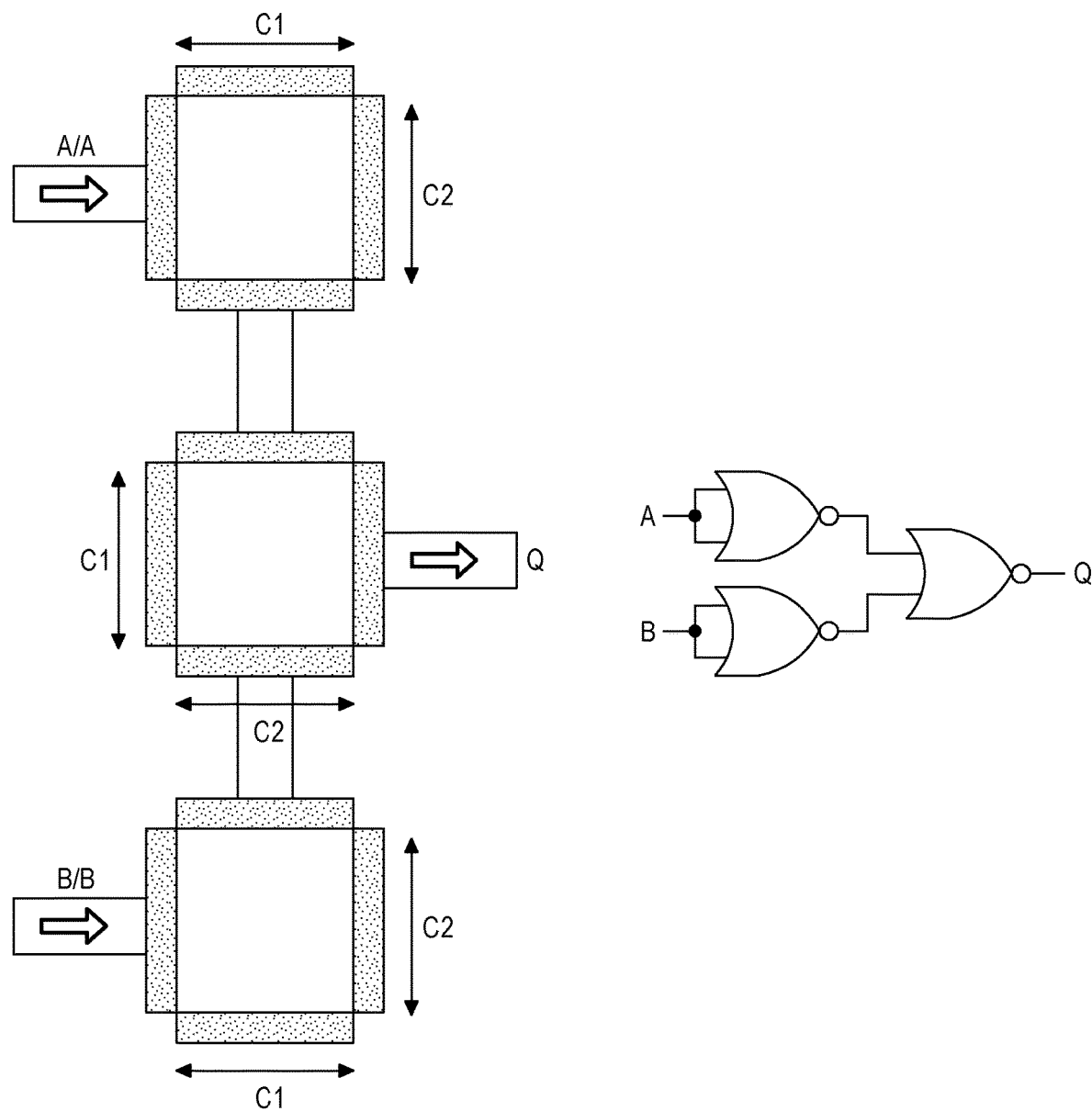
FIG. 16 shows an example of a logic circuit comprising a plurality of gate devices embodying the invention.

A plurality of gate devices embodying the invention can be interconnected in numerous ways to provide all-optical logical circuits with desired logic functionality. Any universal gate embodying the invention can be used, in combination with other like gates, to implement any required Boolean logic function. FIG. 16 shows one such example. Here, an all-optical logic circuit is constructed using three NOR gates to provide AND gate functionality.

It will be seen that the above embodiments offer integrated, highly scalable architectures for ultrafast, energy-efficient logic gates and highly-efficient implementation of all-optical logic circuits. It will of course be appreciated that various changes and modifications can be made to the exemplary embodiments described above. By way of example, in embodiments using spatially-overlapping cavities, the cavities need not be fully-overlapping. An overlap in the region of 20 to 50% may be sufficient for operation. Also, gate devices may have more than one output waveguide in some embodiments. This may be beneficial for "fan-out" to more than one cascaded gate, or to be more compact than traditional beam splitters in a waveguide.

Alternatives/modifications described in relation any particular embodiment may be applied to other embodiments as appropriate. Also, an optical signal described herein as at a wavelength resonant with a mode of a cavity may be exactly at, or sufficiently near, resonance to enable the operation described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optical gate device comprising:
   one or more optical cavities, formed on a substrate, for confining light in a direction parallel to the substrate, and an optically-active material formed in at least one optical cavity of the one or more optical cavities, wherein the optically-active material provides strong light-matter coupling within the at least one optical cavity;
   a pump input formed in the optically-active material, for applying a pulsed optical pump beam to the optically-active material at a wavelength, that when absorbed by the optically-active material, forms an exciton-polariton condensate emitting light;
   at least one input waveguide for input of at least one optical seed signal to the at least one optical cavity at a wavelength corresponding to a resonant mode of the at least one optical cavity;
   an output waveguide for output of an optical output signal in a direction parallel to the substate and at a wavelength corresponding to the resonant mode of the at least one optical cavity, wherein:
   responsive to applying the pulsed optical pump beam to the optically-active material, the optical output signal is selectively provided to the output waveguide based, at least in part, on the exciton-polariton condensate emitting light.

2. The optical gate device of claim 1, wherein a single optical cavity of the one or more optical cavities and a single input waveguide of the at least one input waveguide for input of a plurality of seed signals of the at least one optical seed signal, at the wavelength corresponding to a resonant mode of the single optical cavity, in a direction aligned with the output waveguide, the optical gate device being adapted to: apply the pulsed optical pump beam at a first excitation fluence below a threshold for formation by the pulsed optical pump beam of the exciton-polariton condensate, formation of the exciton-polariton condensate and emission of light providing the output signal occurs in response to the input of a single seed signal; and when the pulsed optical pump beam is applied at a second, lower excitation fluence, formation of the exciton-polariton condensate and the emission of light providing the output signal occurs in response to the input of all of the plurality of seed signals.

3. The optical gate device of claim 1 wherein the at least one optical cavity supports at least two spatially-overlapping resonant modes, the optical gate device being adapted such that: application of the pulsed optical pump beam via the pump input without input of any of the at least one seed signal produces an exciton-polariton condensate associated with one of the at least two spatially-overlapping modes, from which emission of light provides the output signal; and the input of a predetermined number of the at least one seed signal during application of the pulsed optical pump beam produces an exciton-polariton condensate associated with one or more of the other of the at least two spatially-overlapping modes, inhibiting the emission of light providing the output signal.

4. The optical gate device of claim 3, the optical gate device being adapted such that the input of one seed signal of the at least one optical seed signal during application of the pulsed optical pump beam produces the exciton-polariton condensate associated with one of the other of the at least two spatially-overlapping modes, inhibiting the emission of light providing the output signal.

5. The optical gate device of claim 3, the optical gate device being adapted such that input of all of the plurality of the at least one seed signal during application of the pulsed optical pump beam produces an exciton-polariton condensate, associated with one or more the other of the at least two spatially-overlapping modes, inhibiting the emission of light providing the output signal.

6. The optical gate device of claim 3 wherein the pump input is arranged for application of the pulsed optical pump beam at a non-zero angle to the substrate.

7. The optical gate device of claim 3 wherein the pump input comprises a waveguide for input of the pulsed optical pump beam in a direction parallel to the substrate.

8. The optical gate device of claim 3 wherein the at least one optical cavity comprises at least two spatially-overlapping cavities, the optical gate device being adapted such that: application of the pulsed optical pump beam via the pump input without input of any of the at least one optical seed signal produces an exciton-polariton condensate, associated with a mode of the at least two spatially-overlapping resonant modes of a first cavity of the at least two spatially-overlapping cavities, from which emission of light provides the output signal; and input of a predetermined number of the at least one optical seed signal to at least one other cavity of the at least two spatially-overlapping cavities during application of the pulsed optical pump beam produces an exciton-polariton condensate, associated with mode of the at least two spatially-overlapping resonant modes of the first cavity or at least one other cavity, inhibiting the emission of light providing the output signal.

9. The optical gate device of claim 8 wherein the at least two spatially-overlapping cavities comprise first and second orthogonal linear cavities.

10. The optical gate device of claim 9 wherein the at least one input waveguide comprises a single input waveguide for input of the at least one seed signal to the second orthogonal linear cavity.

11. The optical gate device of claim 9, the optical gate device being adapted for operation with a plurality of seed signals and having a plurality of input waveguides for input of respective seed signals to the second orthogonal linear cavity.

12. The optical gate device of 9, further comprising: a plurality of interconnected optical gate devices forming an optical logic circuit, wherein an output waveguide of a first optical gate device is coupled to an input waveguide of a second optical gate device; and cavity lengths of the first and second orthogonal linear cavities of first and second optical gate devices of the plurality of interconnected optical gate devices are tuned such that an output signal from the first orthogonal linear cavity of the first optical gate device provides a seed signal corresponding to a resonant mode of the second orthogonal linear cavity of the second optical gate device, and light emitted by the exciton-polariton condensate associated with a mode of the second orthogonal linear cavity of the second optical gate device is blue-shifted with respect to the wavelength of the output signal from the first optical gate device, thereby inhibiting back-coupling from the second to the first optical gate device.

13. The optical gate device of claim 8 wherein the two spatially-overlapping cavities are linear cavities which comprise the first cavity and at least two other cavities, the optical gate device having at least two input waveguides for input of respective seed signals to respective the at least two other cavities.

14. The optical gate device of claim 8 wherein the at least two spatially-overlapping cavities are linear cavities and the first cavity comprises curved mirrors at respective ends thereof to provide localized states, in a dispersion relation associated with the mode of the at least two spatially-overlapping resonant modes of the first cavity, for the exciton-polariton condensate emitting light providing the output signal.

15. The optical gate device of claim 14 wherein each of the linear cavities comprises curved mirrors at respective ends thereof to provide localized states, in a dispersion relation associated with a mode of the at least two spatially-overlapping resonant modes of that linear cavity, for the exciton-polariton condensate produced by predetermined seed signals.

16. The optical gate device claim 3, further comprising: a plurality of interconnected optical gate devices forming an optical logic circuit, wherein an output waveguide of a first optical logic gate device in the optical logic circuit is coupled to an input waveguide of a second optical gate device in the optical logic circuit.

17. The optical gate device of claim 3 wherein the one or more optical cavities comprises a single elliptical cavity.

18. The optical gate device of claim 3 wherein the one or more optical cavities comprises a single linear cavity and the at least one input waveguide comprises two input waveguides for input of respective seed signals to the single linear cavity, wherein the output waveguide is aligned with the optical axis at one end of the single linear cavity and the two input waveguides are orientated at equal angles to an optical axis at an opposite end of the single linear cavity.

19. The optical gate device of claim 18 wherein the single linear cavity comprises curved mirrors at respective ends of the single linear cavity to provide localized states, in dispersion relations associated with the at least two spatially-overlapping resonant modes, for the exciton-polariton condensate produced by the seed signals providing the output signal.

20. The optical gate device of 1 including a pump source for providing the pulsed optical pump beam to the pump input.

21. The optical gate device of 1 including at least one seed source for providing the at least one optical seed signal to the at least one input waveguide.

22. The optical gate device of claim 1 wherein each of the one or more cavities comprises at least one mirror which comprises one of: a high contrast grating; a distributed Bragg reflector; a photonic crystal, and a metal surface.

23. The optical gate device of claim 1 wherein the optically-active material comprises one of
 a layer of conjugated organic material, and
 at least one semiconductor material forming one of: at least one quantum dot; at least one nanowire; at least one quantum well, and a bulk semiconductor layer.

24. The optical gate device of claim 1, further comprising: an optical logic circuit comprising a plurality of optical gate devices wherein an output waveguide of at least one of the optical gate devices is coupled to an input waveguide of another of the optical gate devices.

25. A method for operating the optical logic gate of claim 1, the method comprising: applying the pulsed optical pump beam to the optically-active material formed in the at least one optical cavity of the one or more optical cavities; and selectively inputting the least one optical seed signal to the at least one optical cavity, wherein the optical output signal is selectively provided to the output waveguide.

\* \* \* \* \*